US006956821B2

(12) United States Patent
Szviatovszki et al.

(10) Patent No.: US 6,956,821 B2
(45) Date of Patent: Oct. 18, 2005

(54) PATH DETERMINATION IN A DATA NETWORK

(75) Inventors: Balázs Szviatovszki, Budapest (HU); Aron Szentesi, Budapest (HU); Alpár Jüttner, Veszprém (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 909 days.

(21) Appl. No.: 09/877,206

(22) Filed: Jun. 11, 2001

(65) Prior Publication Data

US 2002/0141345 A1 Oct. 3, 2002

Related U.S. Application Data

(60) Provisional application No. 60/264,682, filed on Jan. 30, 2001.

(51) Int. Cl.⁷ .......................... G01R 31/08; H04L 12/28
(52) U.S. Cl. ........................ 370/237; 370/238; 370/400
(58) Field of Search ................................ 370/237, 238, 370/238.1, 351, 400, 229, 230, 254, 255

(56) References Cited

U.S. PATENT DOCUMENTS

| | | | |
|---|---|---|---|
| 5,881,050 A | | 3/1999 | Chevalier et al. |
| 6,363,319 B1 | * | 3/2002 | Hsu .......................... 701/202 |
| 6,721,269 B2 | * | 4/2004 | Cao et al. .................. 370/227 |

FOREIGN PATENT DOCUMENTS

| | | |
|---|---|---|
| EP | 0 814 583 | 12/1997 |
| WO | WO 00/79730 | 12/2000 |
| WO | WO 02/062012 | 8/2002 |

OTHER PUBLICATIONS

Semeria et al., "Traffic Engineering for the New Public Network," Dedicated Systems Magazine, Oct. 2000 pp 54–58.
Jüttner et al., "On–Demand Optimization of Label Switched Paths in MPLS Networks," Proceedings 9th International Conference on Computer Communication and Networks Oct. 16–18, 2000 pp 107–113.

* cited by examiner

Primary Examiner—Chau Nguyen
Assistant Examiner—Andrew Wahba
(74) Attorney, Agent, or Firm—Nixon & Vanderhye P.C.

(57) ABSTRACT

A path through a data network is calculated that accounts for priority levels of already-established paths. Potential new paths are determined taking into account priority level information associated with data network links. Of the determined paths, the path selected is preferably one having the least pre-emptive effect on lower priority traffic. The bandwidth reservation information for each data network link is determined along with the maximum bandwidth of each link and the available bandwidth at each priority level. Links with insufficient resources are eliminated from consideration. For the remaining candidate paths, determination for each link are make: which lower priority levels will be affected by the setup of the new path, how much reserved bandwidth will be pre-empted at each priority level, and how much free bandwidth is available at the lowers priority level. A path is selected that reduces or preferably minimizes some aspect of pre-emption.

65 Claims, 5 Drawing Sheets

- - - - - IGP Shortest Path From S to T

⎯⎯⎯ Traffic Engineering Path From S to T

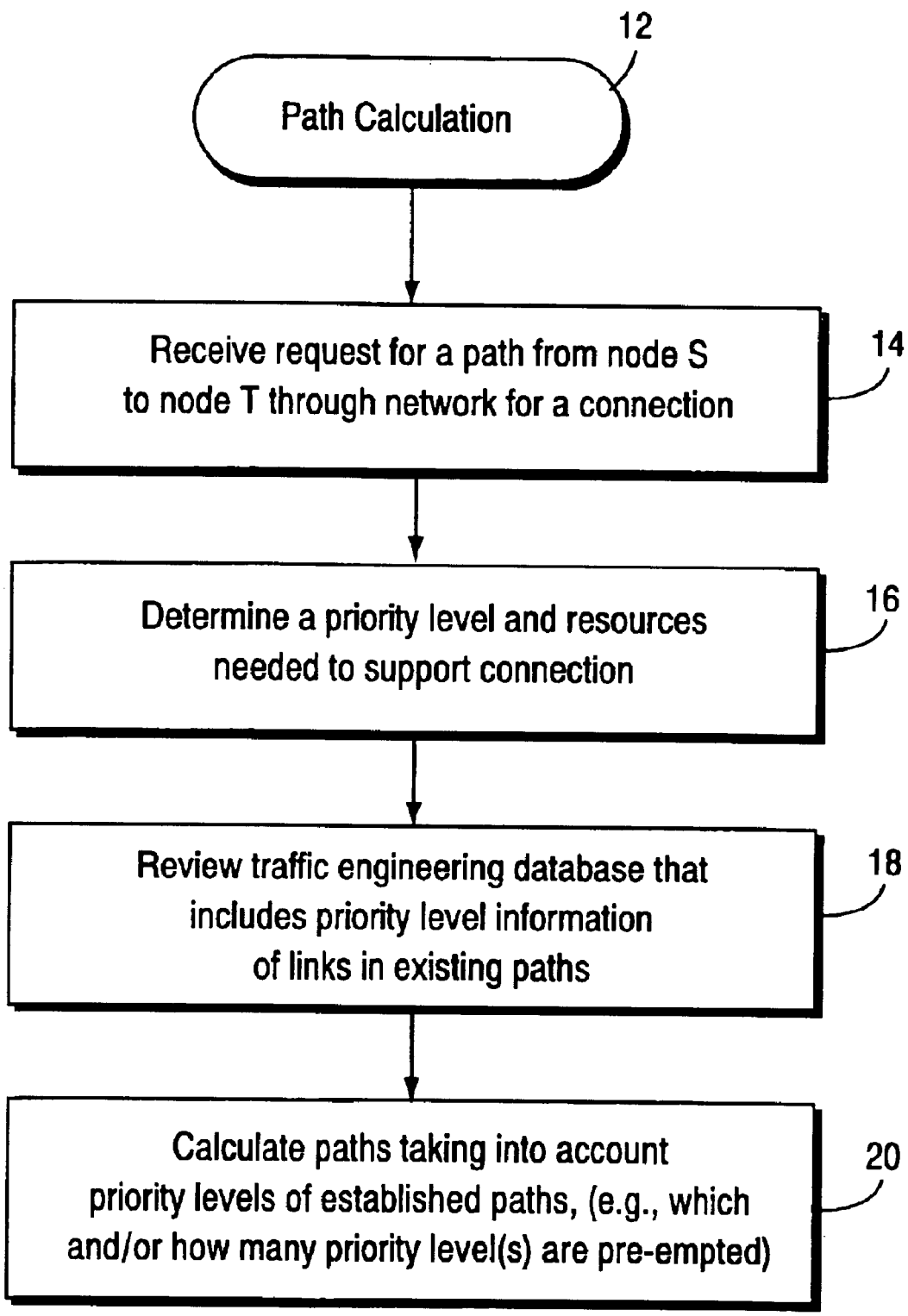

Fig. 5
MPLS Forwarding Table
| Input | Input Label | Output | Output Label |
|---|---|---|---|
| ⋮ | ⋮ | ⋮ | ⋮ |
| 2 | 17 | 3 | 12 |
| ⋮ | ⋮ | ⋮ | ⋮ |
Fig. 6
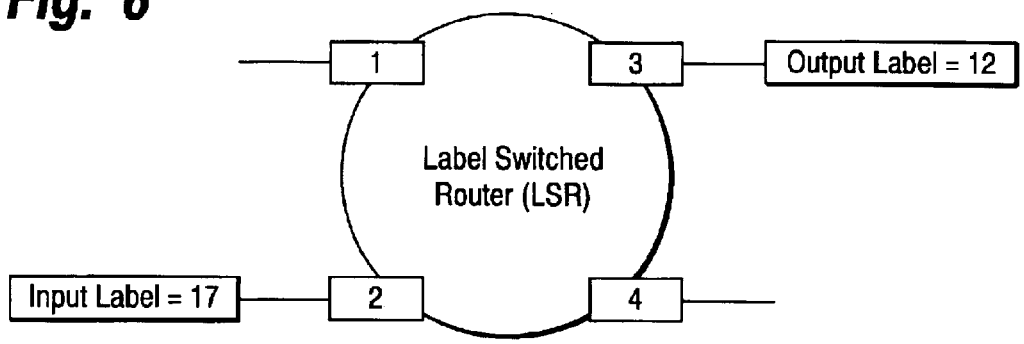
Fig. 7
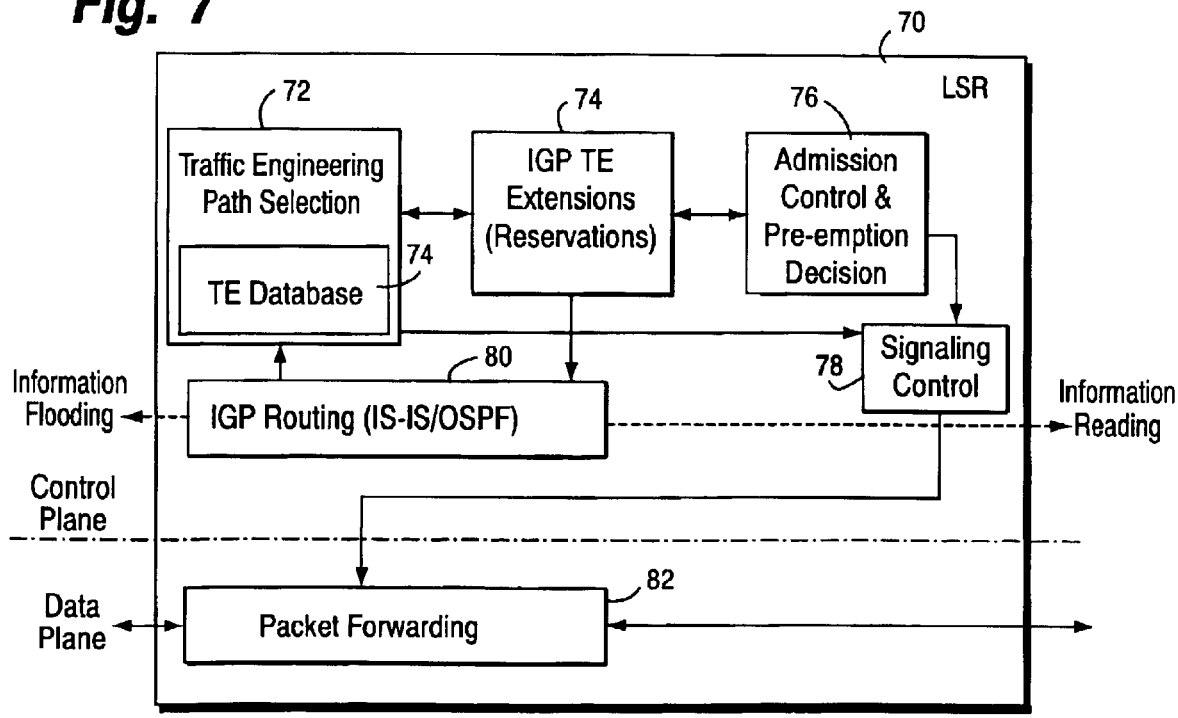

PATH DETERMINATION IN A DATA NETWORK

This application claims priority from commonly-assigned U.S. Provisional Patent Application Ser. No. 60/264,682, entitled "Path Determination in a Data Network," filed on Jan. 30, 2001, the disclosure of which is incorporated herein by reference.

FIELD OF THE INVENTION

The present invention relates to data communications in general, and more particularly, to path selection in a data network.

BACKGROUND AND SUMMARY OF THE INVENTION

The Internet offers access to a huge variety of information resources from global information sources. Internet Service Providers (ISPs) must be able to adapt their data networks to support rapid growth and customer demand for more reliable and differentiated services. At the same time, ISPs must efficiently handle the ever-increasing volume of internet traffic. At a basic level, an Internet Service Provider must provide a physical topology that meets the needs of its customers, and then map customer traffic flows onto that physical topology.

Traffic engineering deals with the mapping of traffic flows onto a particular physical topology, which typically occurs as a by-product of following a shortest path calculated by the ISP's Interior Gateway Protocol (IGP). Unfortunately, IGP shortest path mapping is not a controlled or particularly efficient process, and often results in overallocation of bandwidth at individual links. IGPs do not distribute information, such as bandwidth availability or traffic characteristics, which means that the traffic load in the network is not taken into account in the IGP shortest path calculation. As a result, traffic is not evenly distributed across the network links causing inefficient use of the network resources, e.g., some links are congested while other links remain underutilized. Moreover, because existing IGPs do not take bandwidth availability and traffic characteristics into account when calculating shortest paths through the network, they can actually contribute to network congestion.

A traffic engineering objective therefore should be to provide ISPs control over the placement of traffic flows in the data network, e.g., shift a traffic flow away from the shortest path selected by the IGP onto a potentially less congested physical path. FIG. 1 shows an example of a traffic engineering path compared to an IGP shortest path across a service provider's network from a source point or node S to a termination point or node T. Accordingly, traffic engineering should be used to balance the traffic load on various links, routers, and switches in the network so that (1) none of these components is overutilized or underutilized, and (2) the bandwidth and other resources are efficiently used across the entire network.

Constraint-based routing adds further control over traffic placement by specifying constraints that a path should satisfy. A particular route specification, which specifies source, destination, bandwidth, priority, and constraints, is converted into a path, which specifies the actual adjacent router "hops" on which a path's setup message can be routed hop-by-hop. The goal of path selection is to convert a route specification into a path. The final path is sometimes referred to as an explicit path to emphasize that every router hop is specified. This allows ISPs to view the network at a higher level of abstraction in terms of resources and constraints, rather than nodes and links.

Enhanced control over path selection provides a number of benefits including: the ability to choose paths around known bottlenecks or points of congestion in the network, control over how traffic is rerouted when there are path failures, more efficient use of bandwidth and other network resources by ensuring equal utilization of the entire network, improved operational efficiency resulting in lower costs, improved performance characteristics of the network by minimizing packet loss, minimizing congestion related delays, and maximizing throughput, and increased and improved services to customers.

At the outset, it is helpful to define several terms related to traffic engineering. Each network device is referred to as a node and has one or more logical addresses. There are two basic categories of nodes including (1) hosts like personal computers, workstations, mainframe computers, file servers, and other types of computers, and (2) routers which forward packets between hosts and other routers in order to allow hosts, not connected to the same link, to communicate. A link is a direct connection between two nodes.

Using routing protocols, routers exchange information among themselves about the networks and hosts to which they are connected. This allows them to build routing tables used to select a path for any given packet from the source to the destination. There can be more than one router along the path between any two hosts. Each router makes only an individual decision as to which is the next host or router (the next network "hop") to which a packet must be forwarded in order to reach its final destination. A route specification may be thought of as source and destination internet protocol (IP) addresses, a sequence of loose and strict hops, and a set of constraints. In this context, a path is a sequence of strict hops. Constraint-based routing describes the process of converting a "route specification" into a "path," where each loose hop in the route specification is transformed into a sequence of strict hops in accordance with the route specification's constraints. That process of transforming a loose hop into a sequence of strict hops is referred to as path computation. Once the path is ready for forwarding data packets, the path is operational.

Multi-Protocol Label Switching (MPLS) is emerging as a promising routing/forwarding technology for the core of the internet offering more flexibility than IP-over-ATM routing technology. Accordingly, although the present invention may be used in other routing and forwarding technologies, the present invention finds particularly advantageous application to MPLS technology. Briefly, MPLS directs a flow of IP packets along the predetermined path through a network. This path is called a Label-Switched Path (LSP). In an LSP, traffic flows in one direction from an ingress router (like node S in FIG. 1) to an egress router (like node T in FIG. 1). An LSP is created by concatenating one or more label-switched hops, allowing the packet to be forwarded from one Label-Switching Router (LSR) to another LSR across an MPLS domain or backbone. When an ingress LSR receives an IP packet, it adds an MPLS header to the packet and forwards it to the next LSR in the LSP. The labeled packet is forwarded along the LSP by each LSR until it reaches the tail-end of the LSP where the MPLS header is removed, and the packet is forwarded based on the packet's IP destination address. Significantly, the actual path of an LSP is not limited to what the IGP would choose as the shortest path to reach the destination IP address.

The "Multiprotocol Label Switching," "Internet Traffic Engineering," and "Differentiated Services" working groups of the Internet Engineering Task Force (IETF) are considering architectural enhancements to the basic, best effort, IP infrastructure of the internet which would make—among other things—bandwidth reservation for aggregate data flows an option. Some of the characteristics of this enhanced architecture include distribution to all network nodes of the unreserved bandwidth using "extensions" of link-state interior routing protocols such as IS—IS or OSPF, bandwidth-constrained path selection, explicit routing of LSPs over a computed path, and admission control of LSPs. These changes proposed for the IP network architecture, which depart from the well understood best effort world, create a number of opportunities and challenges.

One challenge is the manner in which paths are selected when LSPs have bandwidth requirements and different priority levels. In fact, LSPs can have multiple setup and holding priorities. The setup priority specifies the importance of establishing an LSP, while the holding priority specifies how important it is for an already established LSP to "hold on" to its reserved resources. An LSP with a higher setup priority can "pre-empt" an LSP with a lower holding priority. In other words, if at path setup, there is not enough free bandwidth available on a link, one or more lower priority LSPs will be pre-empted to accommodate the higher priority LSP. With N different priority levels, a worst case pre-emption "chain" would be N−1 levels. If the pre-emption chain is long, the convergence time of the network, (i.e., the time needed to re-route all pre-empted LSPs), increases. Since it is possible to pre-empt multiple, lower priority LSPs on multiple links, re-routing of a large number of already-established LSPs may be required.

Constrained Shortest Path First (CSPF) algorithms treat an LSP's priority in a simplistic fashion. More specifically, when computing a path for an LSP, bandwidth reservations of lower priority LSPs are not taken into account. There is a need to take into account: (1) LSP multiple level priorities and (2) LSP pre-emption in path computation. The present invention addresses both of those needs. In one example embodiment, the present invention provides a path calculation methodology that takes into account available resource reservation information including the priority levels of existing LSPs, and in particular, lower priority LSPs. Hereafter, the term "priority-aware" path computation means taking into account in some way the priority level of the requested path along with one or more lower priority levels of existing paths in computing a network path for the requested path. A further preferred objective of such a priority-aware path calculation methodology is to minimize pre-emption of lower priority LSPs. Hereafter, the term "pre-emption aware" path computation means taking into account how a requested path might affect any existing path(s).

More generally, the present invention provides a method for calculating a path through a network that accounts for priority levels of already-established paths. For example, when a request is received to calculate a path from a source node to a destination node through a data network to support a connection designating a particular priority level and a particular resource amount/type, e.g., a bandwidth requirement, traffic engineering information including priority level information of links in existing paths is reviewed. Potential new paths are determined taking into account priority levels of established paths. Of the determined paths, the path selected is preferably one which has the least pre-emptive effect on lower priority traffic.

Reviewing the traffic engineering information includes, for example, determining the bandwidth reservation for network links, noting for each link the maximum bandwidth as well as the available bandwidth at each priority level. Links with insufficient resources are eliminated from consideration. Other "costly" paths, e.g., too many router hops, may also (but not necessarily) be eliminated. For the remaining candidate paths, the following determinations for each link are made: which lower priority levels will be affected by the setup of the new path, (e.g., on which priority level existing paths will be pre-empted), how much reserved bandwidth will be pre-empted at each priority level, and how much free bandwidth is available at the lowest priority level. A path is selected that reduces or preferably minimizes some aspect of pre-emption, e.g., the selected path (1) pre-empts the lowest priority level path, (2) pre-empts the least amount of reserved bandwidth, and/or (3) has the most amount of unreserved bandwidth at the lowest priority level.

In an example, non-limiting implementation in the MPLS context, the present invention may be implemented in a Label-Switched Router that includes a packet forwarding module in a data plane and a number of modules in a control plane. In the LSR's control plane, information is flooded using available IGP routing protocols, (e.g., IS-IS or OSPF), including existing bandwidth reservations and priority information from an IGP extension module. A traffic engineering path selection module includes a traffic engineering database for storing the IGP extension reservation information and calculates paths with the requested bandwidth and priority paths in accordance with one or more pre-emption minimization strategies.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2 is a path calculation methodology in accordance with one example embodiment of the present invention;

FIG. 5 is an example of an MPLS forwarding table;

FIG. 6 is a diagram illustrating label switching by a label-switched router (LSR);

FIG. 7 is a function block diagram of an example LSR in which the present invention may be implemented.

DETAILED DESCRIPTION OF THE DRAWINGS

Figure 1:
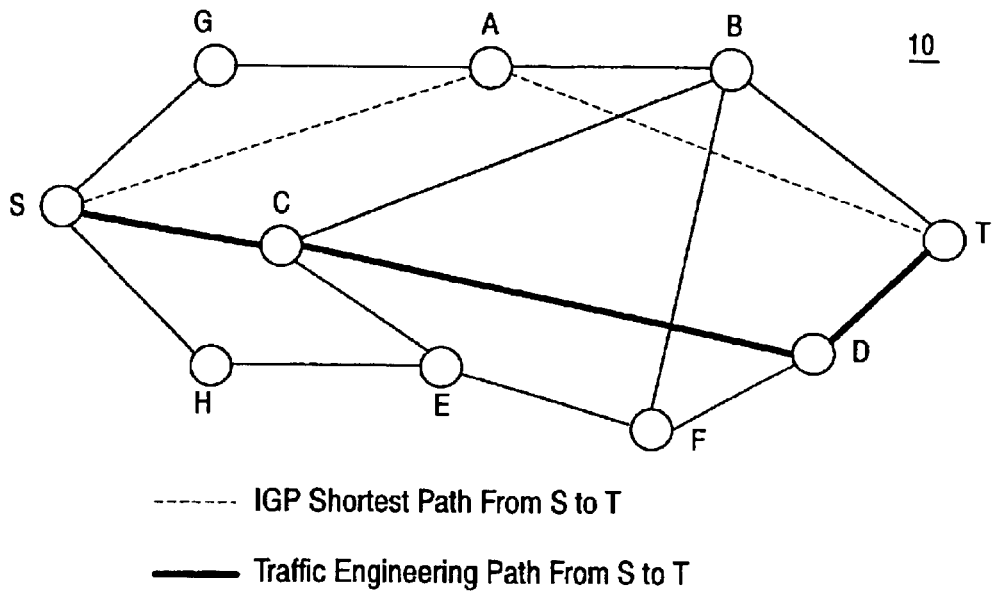
FIG. 1 is a diagram of data network comparing an IGP shortest path to a traffic engineering path.

In the following description, for purposes of explanation and not limitation, specific details are set forth, such as particular embodiments, protocols, data structures, and techniques, in order to provide a thorough understanding of the present invention. However, it will be apparent to one skilled in the art that the present invention may be practiced in other embodiments that depart from these specific details. In other instances, detailed descriptions of well-known methods, systems, and devices are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an Application Specific Integrated Circuit (ASIC), and/or using one or more Digital signal Processors (DSPs).

A first general example embodiment of a path calculation methodology in accordance with the invention is now described in conjunction with the path calculation procedure (block 12) illustrated in FIG. 2. Initially, a request is received at a node, e.g., a node at the edge of a data network, to establish a path from a source node (S) to a termination or tail (T) node through a data network to support a connection (block 14). A priority level and resource requirement needed to support that connection is determined (block 16). The steps in blocks 14 and 16 are part of the route specification. A traffic engineering database which is maintained in the node includes priority level information of links in existing paths received from other network nodes. One or more paths is then calculated, taking into account priority levels of established paths as reflected in the traffic engineering database (block 20).

One non-limiting example of how priority levels may be taken into account in the path calculation is to estimate which and/or how much lower priority traffic is pre-empted for each calculated path. One reason for taking into account priority levels of established paths when calculating a new path is that the path selected to support a connection through the network should preferably be the one that minimizes the pre-emption of lower priority paths. This enhances the stability of a multiple priority level data network, results in less re-routing in the network, and provides for efficient utilization of network resources while at the same time accommodating different priority levels of traffic.

Figure 3:
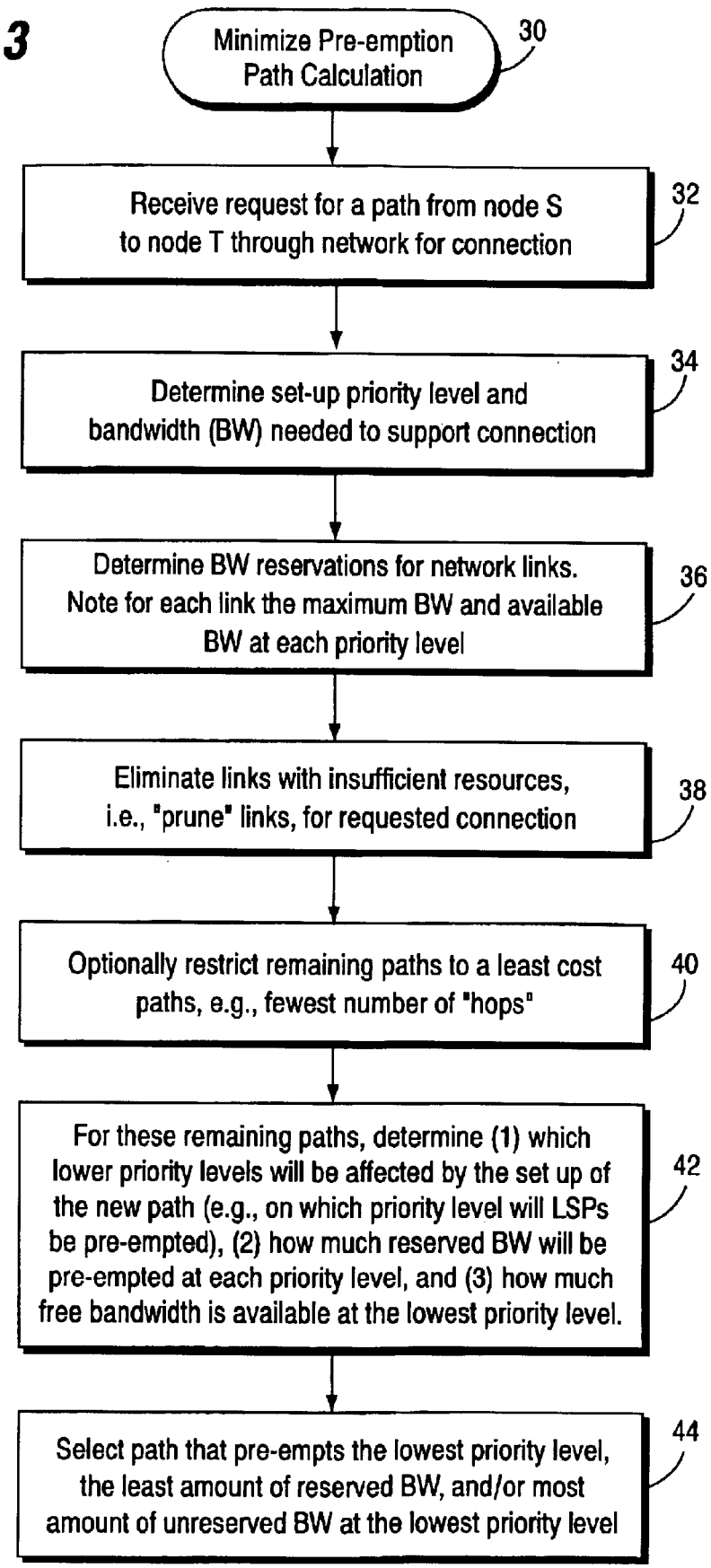
FIG. 3 is a flowchart diagram illustrating a minimize pre-emption path calculation methodology in accordance with another example embodiment of the present invention.

FIG. 3 shows a minimized pre-emption, path calculation procedure (block 30) in accordance with one example for minimizing pre-emption in path calculations that take into account priority levels of established paths. Similar to FIG. 2, a request for a path from node S to node T is received (block 32), and a setup priority level and bandwidth needed to support this connection are determined (block 34). The bandwidth reservations for existing network links are determined (block 36). For each link, the maximum bandwidth and available bandwidth are noted at each priority level. Links with insufficient resources for the requested connection may be eliminated or "pruned" (block 38). The remaining paths are restricted to "least cost" paths, e.g., paths with the fewest number of router hops (block 40). For the remaining paths, a determination is made (1) which lower priority levels will be affected by the setup of the new path, (i.e., on which priority level will LSPs be pre-empted), (2) how much reserved bandwidth will be preempted at each priority level, and (3) how much free bandwidth is available at the lowest priority level, (i.e., free bandwidth on the link) (block 42). That path pre-empting the lowest priority level paths, the least amount of reserved bandwidth at the loser priority levels, and/or having the most unreserved bandwidth at the lowest priority level (i.e., free bandwidth) is selected as the calculated path (block 44).

This approach to path calculation decreases the number of pre-empted, lower priority paths, resulting in less re-routing in the network and greater network stability because previously established traffic is only disturbed where necessary. These advantages are achieved without modification to currently proposed IGP TE extensions. Moreover, the complexity of such a priority and pre-emption aware path calculation is on the same order as conventional CSPF algorithms.

Figure 4:
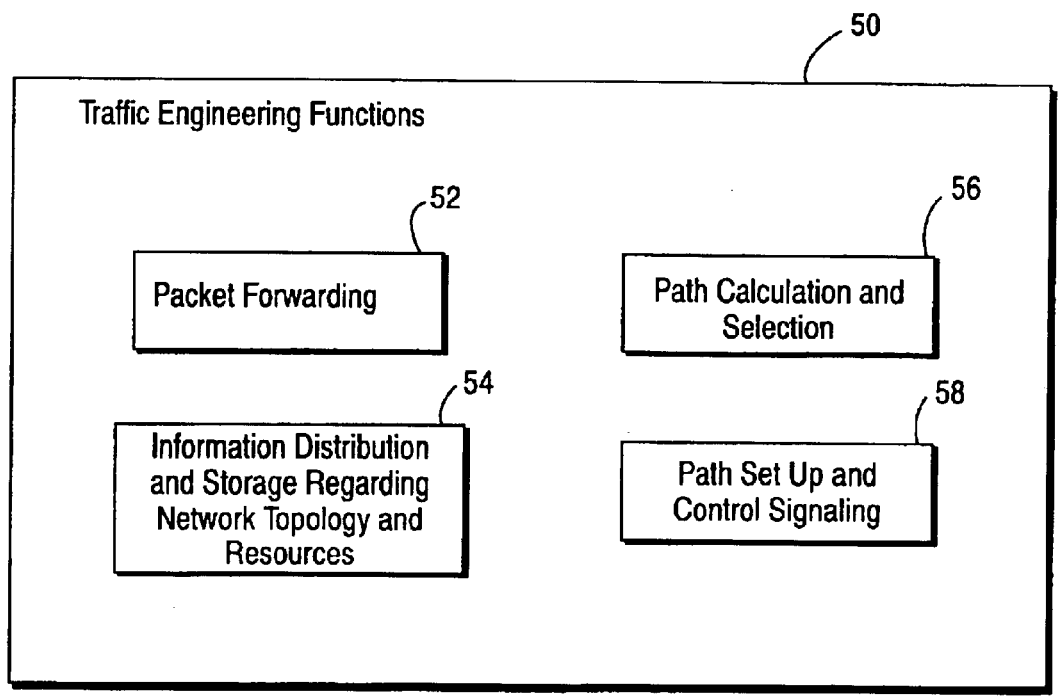
FIG. 4 is a function block diagram illustrating traffic engineering functions performed at nodes in a data network.

Although the present invention may be employed in any network node for any path calculation approach using any one or more of a variety of data communication protocols, a preferred, example, and non-limiting embodiment is now set forth in the context of Multi-Protocol Label Switching (MPLS). As mentioned in the background, the IETF has been considering traffic engineering approaches based on the Multiprotocol-Label Switching and Differentiated Services technologies. Traffic engineering using MPLS involves four functional components. These four functional components are set forth in the Traffic Engineering Functions block 50 shown in FIG. 4. The four traffic engineering functions include: packet forwarding 52, information distribution and storage regarding network topology and resources 54, path calculation and selection 56, and path setup and control signaling 58. Each component 52–58 is an individual functional module with interfaces therebetween. The packet forwarding component 52 is responsible for directing a flow of IP packets along a predetermined path across a data network such as shown in FIG. 1. The path is called a Label-Switched Path (LSP). One LSP is required to carry traffic in a single direction from an ingress router (such as node S shown in FIG. 1) to an egress router (such as node T shown in FIG. 1). An LSP is created by concatenating one or more label-switched hops, which allow a packet to be forwarded from one Label Switching Router (LSR) to another LSR across the MPLS network.

When an ingress LSR receives an IP packet, it adds an MPLS header to the packet and forwards it to the next LSR in the LSP. The labeled packet is forwarded along the LSP by each LSR until it reaches the tail end T of the LSP. At that point, the MPLS header is removed, and the packet is forwarded based on its IP destination address. Significantly, the physical path of the LSP is not limited to what the IGP would choose as the shortest path to reach the destination IP address.

Packet forwarding at each LSR is based on label swapping. Each MPLS packet carries an encapsulation header that contains a fixed length label field. When a packet containing a label arrives at an LSR, the LSR examines the label, and uses it as an index into its MPLS forwarding table. Each entry in the forwarding table contains an input interface-inbound label pair that is mapped to a set of forwarding information applied to all packet arriving at the specific interface with the same inbound label. An example of an MPLS forwarding table is shown in FIG. 5. The MPLS forwarding table includes an input interface field, an input label field, an output interface field, and an output label field.

FIG. 6 illustrates label swapping in an LSR based on the information in the MPLS forwarding table of FIG. 5. A packet is received on the input interface 2 containing a label 17. Using the information from the forwarding table shown in FIG. 5, the LSR replaces the label 17 with an output label value of 12 and forwards the packet out on output interface 3 to the next hop LSR.

Thus, when a packet reaches an MPLS backbone network, the ingress LSR examines the IP header, classifies the packet, assigns a label, encapsulates the packet in an MPLS header, and forwards the encapsulated packet toward the next hop in the LSP. As the packet traverses the LSP, each LSR uses the label, to make the forwarding decision, without consulting the original IP header. The incoming interface and label are used as lookup keys into the MPLS forwarding table. The current label is replaced with a new label and the packet is forwarded to the next hop along the LSP. This process is repeated at each LSR in the LSP until the packet reaches the egress LSR. When the packet arrives at the egress LSR, the label is removed, and the packet is forwarded based on the destination IP address contained in the original IP header according to the traditional shortest path calculated by the IP routing protocol.

Traffic engineering requires detailed knowledge about the network topology as well as dynamic information about network loading. The information distribution and storage module 54 is used to satisfy this traffic engineering requirement. "Extensions" to the Internet Gateway Protocol (IGP) are employed so that link attributes are included as part of each router's link-state advertisement, more commonly referred to as "information flooding." The present invention is concerned with the bandwidth reservation, priority level, and preferably, pre-emption related attributes and mechanisms of MPLS. Example extensions include IS-IS extensions and OSPF extensions. The conventional flooding algorithm used by the link-state IGP ensures that these link attributes are distributed to all routers in the MPLS routing domain.

The next component is path calculation and selection 56. FIG. 7 shows an LSR 70 with a traffic engineering and path selection module 72. Module 72 is in the control plane of the LSR while the packet forwarding module 82 (the functions of which are described above) is in the data plane of the LSR. An IGP routing module 80 performs information flooding to other routers as well as reading the flooded information received from other routers in order to maintain a traffic engineering database 74.

For purposes of the following description, traffic engineering control attributes are classified based on those currently proposed in the Internet Engineering Task Force which use the terms traffic trunks, associated attributes, and resource associated attributes. A traffic trunk is another term for a route specification. Thus, the task is to select a path for a traffic trunk. In addition to basic traffic engineering attributes that specify the source and destination between which the traffic trunk should be established along with the bandwidth to be reserved, "pre-emptor" and "pre-emptable" attributes are also specified. In RSVP and Label Distribution Protocol (LDP), priorities associated with paths through the network may be specified in the form of "setup" priorities and "holding" priorities. The setup priority specifies the importance of an LSP establishment, and the holding priority specifies how important it is for an already-established LSP to hold on to its reserved bandwidth resources. Both setup and holding priorities have a range of zero (highest priority) to seven (lowest priority), i.e., eight priority levels. Priorities associated with traffic trunks are used to enable admission control and pre-emption functions in the admission control and pre-emption decision module 76 shown in FIG. 7. An LSP with a higher setup priority can pre-empt an LSP with a lower holding priority. However, to avoid continuous pre-emption, holding priorities should not be lower than the setup priority. Pre-emption can also be used to ensure that high priority traffic trunks may be routed through relatively favorable paths, e.g., on shortest paths.

Similar to traffic trunk related attributes, resource related attributes can be used to constrain the routing of traffic trunks through a specific resource. In other words, a resource related attribute may be specified to configure the resources available for allocation to traffic trunks. IGP extensions of OSPF and IS-IS perform this function by flooding the maximum bandwidth along with the maximum reservable bandwidth of a resource, e.g., a trunk or link. IGP extensions enable pre-emption of existing resource reservations. Unreserved bandwidth is specified for each priority level on a specified link. In other words, the unreserved bandwidth (BW) is specified as the amount of bandwidth not yet reserved on each of eight priority levels for a specified link, i.e., an unreserved BW vector $B_u=(B_{u0}, B_{u1}, \ldots B_{u7})$. If a highest priority LSP is established, (level 0), the available reserved bandwidth on the remaining seven priority levels on a specified link decreases, i.e., $B_{u1}$–$B_{u7}$ decrease. On the other hand, if a lowest level LSP is established on a link, only $B_{u7}$ in the unreserved bandwidth vector $B_u$ is changed. The unreserved bandwidth vector $B_u$ is part of the flooded resource information stored in the traffic engineering database 74 for each link.

After network link attributes and topology information are flooded by the IGP routing module 80 and stored in the traffic engineering database 74 of LSRs in the network, the traffic engineering path selection module 72 in each ingress LSR uses information in its traffic engineering database 74 to calculate the paths for each requested LSP. The path for each LSP can be represented by either a strict or loose explicit route. An explicit route is a preconfigured sequence of LSRs (part of the route specification) that should be part of the calculated path of the LSP. If the ingress LSR specifies all the LSRs in the LSP, the LSP is identified by a strict explicit route. However, if the ingress LSR specifies only some of the LSRs in the LSP, the LSP is a loose explicit route. Strict and loose explicit routes give flexibility to the path selection process but also permit the path selection process to be constrained where necessary.

The ingress LSR determines the physical path for each LSP by applying a Constrained Shortest Path First (CSPF) algorithm to the information in the traffic engineering database 74. CSPF is a shortest-path-first algorithm that can be modified to take into account specific restrictions or constraints when calculating the shortest path across the network. Input to the CSPF algorithm includes: topology link state information learned from the IGP flooded information and stored in the traffic engineering database 74, attributes associated with the state of network resources including total link bandwidth, reserved link bandwidth, available link bandwidth, etc., carried by IGP extensions and also stored in the traffic engineering database 74, and administrative attributes required to support the traffic traversing the proposed LSP to be setup including required bandwidth requirements, maximum hop count, maximum delay, etc. CSPF considers each candidate node and link for an LSP, accepting or rejecting a specific path component based on resource availability or whether selecting the path component violates a particular constraint. The output of the CSPF calculation is a path which is specified with the help of an explicit route consisting of a sequence of LSR addresses that provides the shortest path to the network meeting the specified constraints. This route is then passed to the signaling control module 78 which establishes the forwarding state in the LSRs along the LSP. The CSPF algorithm is repeated for each LSP the ingress LSR is required to generate.

Because the information residing in the traffic engineering database about the state of the network at any particular point in time is usually out of date, the CSPF computes a path thought to be acceptable. However, the path is not known to be acceptable until the LSP actually establishes it via the path set up and control module 58 in FIG. 5B. In the LSR 70 in FIG. 7, these path setup and control functions are performed by the admission control and pre-emption decision module 76 and the signaling control module 78. The signaling control module 78 uses extensions to either the Resource Reservation Protocol (RSVP) or the LDP protocol to establish the LSP on the explicit path (strict hop). The signaling control module 78 inquires of the admission control and pre-emption decision module 76 in each LSR along the calculated path whether the setup of the selected LSP can actually be supported by that LSR. The admission control and pre-emption decision module 76 in these LSRs each consults its respective traffic engineering database 74 to determine if there are sufficient resources, e.g., sufficient bandwidth, to support the selected LSP. If so, path setup continues. If not, the admission control and pre-emption decision module 76 may pre-empt resource reservations for lower priority LSPs to support the current request. If there are no lower priority reservations to be pre-empted, the LSP setup is blocked.

Figure 8:
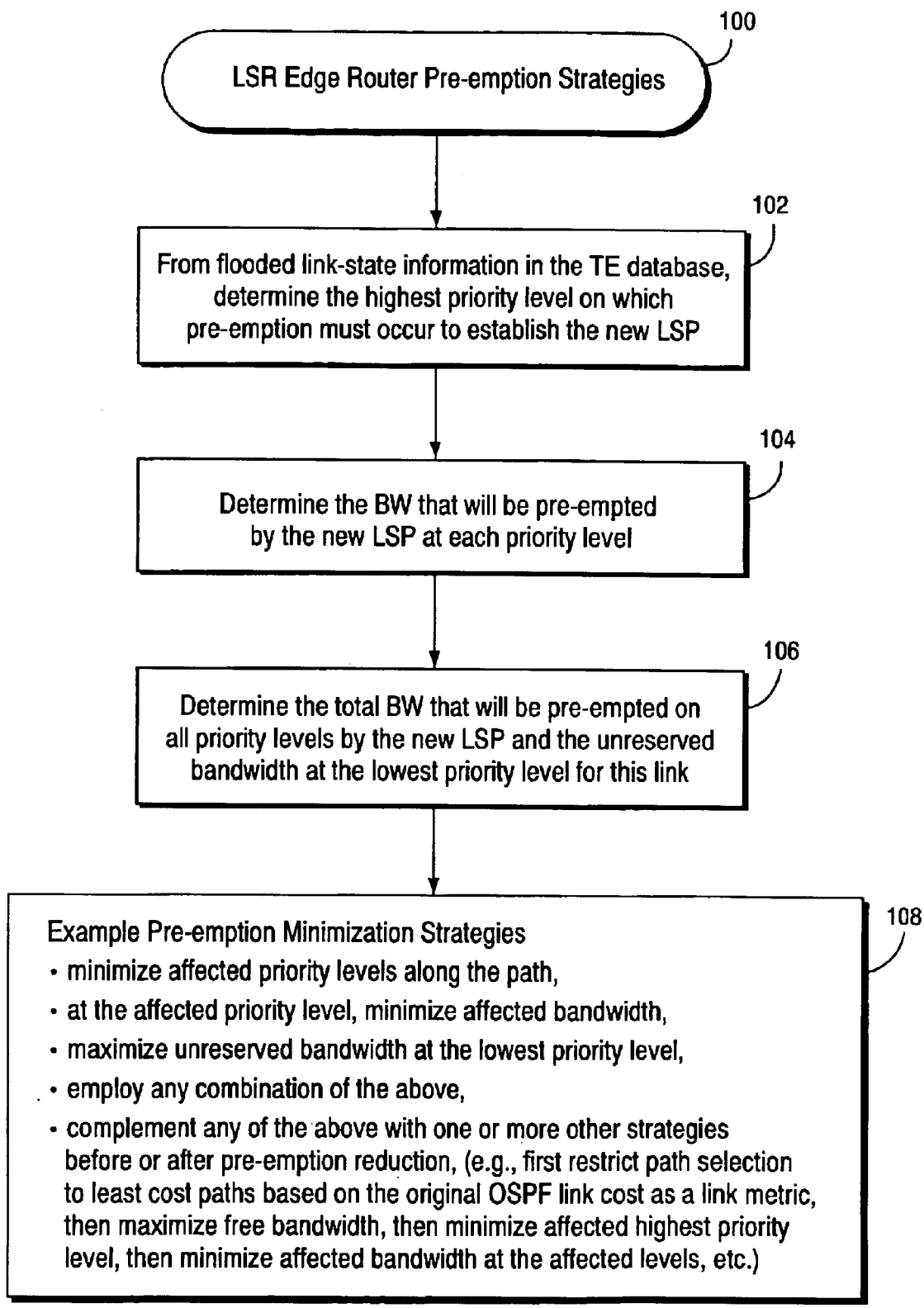
FIG. 8 is a flowchart diagram illustrating LSR edge router pre-emption strategies in accordance with another example of the present invention.

FIG. 8 shows an example LSR Edge Router Pre-emption Strategies flow diagram (block 100). From flooded link state information stored in the traffic engineering database, the highest priority level on which pre-emption must occur to establish the new LSP path is determined (block 102). The bandwidth that will be pre-empted by the new LSP at each priority level on the link is determined (block 104). The total bandwidth that will be pre-empted on all priority levels for this link by the new LSP is determined (block 106). The unreserved bandwidth at the lowest priority level for this link is also determined. From these determinations, one or more pre-emption minimization strategies is implemented to select the LSP path. Example pre-emption strategies include:

- minimize affected priority levels along the path,
- at the affected priority level, minimize affected bandwidth,
- maximize unreserved bandwidth at the lowest priority level,
- employ any combination of the above,
- complement any of the above with one ore more other strategies before or after pre-emption reduction, (e.g., first restrict path selection to least cost paths based on the original OSPF link cost as a link metric, then maximize free bandwidth, then minimize affected priority levels, then minimize affected bandwidth at the affected levels, etc.)

By selecting a shortest path upon which the probability of pre-empting lower priority traffic is the lowest, network stability is improved because of less re-routing in the network. By decreasing the number of pre-empted lower priority LSPs, the pre-emption chain, i.e., number of affected LSPs, is decreased, thereby providing faster restoration.

A non-limiting, example of the present invention in a bandwidth-constrained CSPF algorithm is now described. The CPSF method in accordance with this example implementation of the invention is both priority-aware and pre-emption-aware. While a shortest path algorithm is desirable in many applications, the invention is not limited to shortest path algorithms.

An LSP to be set up has a particular set of priority attributes "s" and a particular bandwidth requirement $B_{LSP}$. For this LSP path calculation, the traffic engineering path selection module 72 marks all links in its database 74 as "invalid" having an unreserved bandwidth at the priority level of the LSP setup priority that is less than the LSP's bandwidth requirement. This can be determined as a simple inequality comparison $B_{us} < B_{LPS}$. In other words, links are eliminated or "pruned" that do not have enough unreserved bandwidth to support the LSP with the given priority s. Next, a shortest path algorithm (such as the well-known Dijkstra CSPF algorithm) is executed on those links not marked as "invalid" in the database 74. Such an algorithm minimizes the original link "cost" (e.g., OSPF or IS-IS cost) of the path. The resulting path (if any) is the LSP's path. This type of shortest path algorithm pre-empts lower priority LSPs by treating lower level bandwidth reservations as if they did not exist. Therefore, when the new LSP path setup signaling traverses the explicitly calculated LSP path, the admission control and pre-emption decision modules 76 at each hop check to ensure that the path calculated based on the "old" link data information stored in the TE database 74 is still appropriate in light of the current link state information. Indeed, there may not be enough unreserved bandwidth at the LSP's priority level because of a change of other LSP reservations since the time the database was updated.

To become pre-emption-aware, measures are provided to determine or estimate how much and/or where pre-emption will occur when a new LSP path is established. The estimated pre-emption measures are used to restrict path selection. The shortest path with the required bandwidth, the required priority level, and the least pre-emption is selected.

In currently proposed IGP extensions, only summarized information about reserved resources may be provided. In other words, proposed IGP extensions do not provide information for individual LSPs on distant links. Neither the number of LSPs nor their bandwidth values are provided. The summarized information may be sufficient to determine if a link has the required resources to accommodate a new LSP at a certain priority level. However, such summarized information is not sufficient to determine the pre-emption effect of the new connection set up on existing, lower priority LSPs. Although detailed LSP information is not available for path computation, heuristic methods may be used to minimize pre-emption based on summarized information about reserved resources available from IGP extensions.

The following reservation-related information may be distributed for each link in the network for engineering extensions to link-state IGPs:

- the true link capacity, i.e., maximum bandwidth $B_{MAX}$,
- the maximum reservable bandwidth on the link $B_{max}$,
- an unreserved bandwidth vector $B_u = (B_{u0}, B_{u1}, \ldots, B_{u7})$ containing the actual unreserved bandwidth values at each priority level. The unreserved bandwidth at the lowest level $B_{u7}$ is the available free bandwidth of the link.

In implementing a priority-aware and pre-emption-aware CSPF in an LSR, links are identified that have enough unreserved bandwidth at the holding priority level equal to the setup priority of the new LSP, i.e., $B_{us} < B_{LSP}$. For those links identified, the amount of bandwidth that will be pre-empted if the new LSP is established using that link is calculated.

Considering a new LSP to be set up with priority s and bandwidth $B_{LSP}$. For each link, $B_{sum}$ is the bandwidth value that will be pre-empted on this link by the new LSP:

$$B_{sum} = \begin{cases} 0 & \text{if } B_{LSP} < B_{u7} \\ B_{LSP} - B_{u7} & \text{otherwise} \end{cases} \quad (1)$$

$B_{sum} = 0$ means that no pre-emption occurs on links that have more unreserved bandwidth at the lowest priority level ($B_{u7}$) than the requested bandwidth $B_{LSP}$. Thus, the priority-aware and pre-emption-aware CSPF algorithm may select a path that minimizes the total or sum preempted bandwidth $B_{sum}$ on the link. In the situation where no pre-emption occurs, i.e., $B_{sum} = 0$, the widest path which can be achieved is preferably selected by examining the free bandwidth of the link $B_{u7}$. This achieves a pre-emption-aware, widest path selection. Thus, a first heuristic for determining a best path is to select the links with the lowest pre-empted bandwidth $B_{sum}$.

Another heuristic to select a path is to consider an estimate of pre-empted bandwidth per priority level. A vector $B_P$ of bandwidth values that will be pre-empted on a link by a new LSP at each priority level is given by the following:

$$B_p = (B_{p0}, B_{p1}, B_{p2}, \ldots, B_{p7}) \quad (2)$$

Although $B_p$ is not included in the information flooded by the IGP, it may be derived using the parameters provided in the originally flooded information. One procedure for deriving $B_p$ is set forth below:

procedureCalculateBwPreemptionVector($B_u$, $B_{LSP}$)
  $B_p=0$
  $B_{u(-1)}=B_{max}$
  for (i=7,i≧0, i--)
    if $B_{LSP} \leq B_{u1}$ return $B_p$
    $B_{p1}=\min((B_{LSP}-B_{ui}),(B_{u(i-1)}-B_{u1}))$
  end for
  return $B_p$
end procedure.

The bandwidth pre-emption vector $B_p$ provides useful information. For example, the highest affected priority level on a link may be derived from this vector by detecting the smallest bandwidth pre-emption value that does not equal zero, i.e., $B_{p1} \neq 0$. Consider the following example:

Assume a 100 Mb/s link with the unreserved bandwidth vector and an LSP with $B_{LSP}=70$ Mb/s bandwidth requirement and s=3 setup priority. Since the bandwidth available at priority level 3 is $B_{u3}=100$ MB/s, the new LSP requiring 70 Mb/s in bandwidth can use this link. If this link will be included in the LSP's path, pre-emption will occur. The per-priority level, pre-empted bandwidth values are calculated based on the pre-emption $B_p$ procedure outlined above as now described. For priority 7, $B_{u7}=0$ is smaller than $B_{LSP}$. Therefore, the minimum operator "min" is used. The second term indicates there is no LSP at this level, so $B_{p7}=0$. Similarly, $B_{p6}=0$. For i=5, the second term indicates that 20 Mb/s should be pre-empted on the $5^{th}$ priority level. On level 4, there is a 40 Mb/s LSP with priority 4. Since the new LSP pre-empted 20 Mb/s at the previous level 5 and 20 Mb/s is free on the link, at this level 4 only the remaining needed 30 Mb/s will be pre-empted. This is guaranteed by the first term in the "min" operation. At the next cycle with i=3, the procedure exits after checking the "if" operation. Accordingly, the bandwidth pre-emption vector for this link is $B_p=(0, 0, 0, 0, 30, 20, 0, 0)$.

The three 100 Mb/s links below are described in conjunction with the free bandwidth $B_{u7}$ and bandwidth pre-emption vector $B_p$ measures to decide which link is more desirable to be used for the selected path. The bandwidth pre-emption vector $B_p$ was calculated above for the first link. The similarly calculated bandwidth pre-emption vectors for the second and third links are included.

$B_p^1=(0, 0, 0, 0, 30, 20, 0, 0)$, $B_{u7}=20$ Mb/s
  $B_p^2=(0, 0, 0, 0, 0, 10, 30, 30)$, $B_{u7}=0$ Mb/s
  $B_p^3=(0, 0, 0, 0, 0, 20, 20, 30)$, $B_{u7}=0$ Mb/s

Bandwidth is pre-empted on the first link on the lowest four priority levels. On the second and the third links, only the fifth priority level is affected. It may be desirable to use such links for path setup where only lower priority levels are affected. The bandwidth pre-emption vector $B_p$ shows that the second link has less affected bandwidth on the fifth priority level that the third. This makes the second link more desirable then the third.

Considering free bandwidth, the 70 Mb/s LSP preempted only 50 Mb/s lower priority LSPs on the first link because the free bandwidth of this link is 20 Mb/s. On the other two links, prior to LSP establishment, there is no free bandwidth because 70 Mb/s is preempted. A free bandwidth measure would therefore indicate that the first link is more desirable.

Accordingly, example measures for estimating preemption on a link may include free bandwidth (unreserved bandwidth at the lowest priority level) and a bandwidth pre-emption vector. Using such heuristic measures, preemption minimization metrics may be constructed for use in CSPF algorithms. First, a link metric is determined for each link in a path using the heuristic measure(s) associated with the link. Second, a path metric is determined for each path metric by "accumulating" or processing the link metrics for the links in its path. In the Dijkstra CSPF algorithm, this is accomplished by defining an accumulator function. Third, the path metrics are then compared in order to select one of the paths having the best path metric value. In the Dijkstra CSPF algorithm, this is accomplished by defining a comparator function.

As an example, free bandwidth $B_{sum}$ may be chosen as a link metric to be maximized. Consider two links L1 and L2 that make up one path P1. Assume link L1 has a free bandwidth $B_{sum}=0$, and link L2 has a $B_{sum}=50$. Therefore, link L1 is the "bottleneck" link. The accumulator function is defined so that the path metric corresponds to metric of the bottleneck link. For path P1, the path metric is therefore 0. For another path P2 with links L3 and L4, assume link L3 has a $B_{sum}=50$, and link L4 has a $B_{sum}=50$. Therefore, the path P2 metric is 50. The comparator function is defined to compare the path metrics for both paths and selects path P2 because it has the larger path metric.

A similar procedure may be applied to determine the path with the fewest affected, lower priority levels. Using the bandwidth pre-emption vector $B_p$ measure as a link metric, the affected priority levels may be minimized by pre-empting only those LSPs with the lowest priority. A comparator function is defined for the bandwidth pre-emption vector measure as follows:

$B_p^1 < B_p^2$ if for their first (counting from 0) different coordinate with index $i, B_{p1}^1 < B_{p1}^2$.

With this definition, the comparator function implements two tie-breaking concepts. If two paths have different, highest-affected priority levels, the path with the lower priority level is chosen. But if the affected priority levels are the same, the "smaller" path is selected with the lowest pre-empted bandwidth on the highest affected priority level.

In order to minimize the affected priority levels $B_p$ along the path of the LSP setup, two kinds of accumulator functions may be used. From the flooded bandwidth reservation information, it is uncertain whether the same LSPs are carried on two consecutive links or on different ones. If the LSPs are carried on two consecutive links, $B_p$ is a concave metric. As an example, the bandwidth pre-emption vector $B_p$ may be chosen as a link metric to be minimized. Consider two links L1 and L2 that make up one path P1. Assume link L1 has a bandwidth pre-emption vector $B_p^1$, and link L2 has a bandwidth pre-emption vector $B_p^2$. If $B_p^1 < B_p^2$ based on the "<" operation defined previously for the comparator function, link L2 has the least favorable or "worst" measure, i.e., higher priority levels are affected on this link.

For a concave metric, the accumulator function is defined so that the path metric corresponds to metric of the "worst" link, i.e., the largest $B_p$ vector is taken as the path's metric. The comparator function is defined to compare the path metrics for both paths and selects the path with the smaller $B_p$. If $B_p$ is not a concave metric, the preempted per priority bandwidth on each link of the new LSP should be minimized. To achieve this in the accumulator function, the elements of the $B_p$ vector are added one-by one to determine the path's metric. Consider two links L1 and L2 that make up path P. Assume link L1 has a bandwidth pre-emption vector $B_p^1$, and link L2 has a bandwidth pre-emption vector $B_p^2$. The path metric is thus a $B_p$ vector, where $B_{p1}=B_{p1}^1+B_{p1}^2$ for all eight priority levels.

When there is no pre-emption, the widest path is used by incorporating the free bandwidth as a last (ninth) element in the bandwidth pre-emption vector. Using the above-defined comparator function, $-B_{u7}$ is used as the ninth element in $B_p$. In this case, pre-empted bandwidth is to be minimized, while free bandwidth is maximized. The minimize-the-affected-priority-levels strategy selects widest paths in terms of free bandwidth if lower priority levels are not affected on any link of the path.

When there are plural path metrics, it may be desirable to specify the order of metric comparison in the comparator function. Of course, this example CSPF implementation is not limited to such or to a particular order. Consider the example where the order of the metrics preferably minimize pre-emption without adversely affecting the CPSF success rate or the path length of high priority LSPs. To achieve this, links for which $B_{us}<B_{LSP}$ are first eliminated or "pruned." (Again, s is the setup priority of the LSP for which the path is calculated). For the remaining links, path selection may be restricted to shortest paths based on the original cost, (i.e., OSPF or IS-IS cost). By using the link cost as the first metric in the comparator function of the Dijksta CPSF algorithm, high priority LSPs are always routed on shortest paths, irrespective of lower priority traffic. Pre-emption information is preferably used thereafter when selecting a candidate path among otherwise shortest feasible ones. Table 1 below shows example orderings of metrics. Other orders and combinations of metrics are possible and envisioned as represented in the $5^{th}$ row. However, it is preferable that a pre-emption minimization metric be used.

Example Metrics and Ordering of Proposed Algorithms

TABLE 1

|  | 1st metric | 2nd metric | 3rd metric |
|---|---|---|---|
| 1st method | shortest | free bandwidth |  |
| 2nd method | shortest | bandwidth pre-emption vector |  |
| 3rd method | shortest | any other metric | free bandwidth |
| 4th method | shortest | any other metric | bandwidth pre-emption vector |
| 5th method | any metric | any metric | any metric |

While the present invention has been described with respect to particular illustrative embodiments, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Thus, the present invention is to be accorded the widest scope consistent with the principals and novel features disclosed herein. Accordingly, it is intended that the invention be limited only by the scope of the claims appended hereto.

What is claimed:

1. A method for determining a new path through a data network that accounts for priority levels associated with established paths in the data network, wherein the paths are Label Switched Paths (LSPs) established using Multi-Protocol Label Switching (MPLS), comprising:

determining data network link attributes provided by various label switched routers in the data network;

storing the determined link attributes in a database;

determining a highest priority level on which preemption will occur to establish a new LSP;

determining a bandwidth that will be preempted by the new LSP;

determining a total bandwidth that will be preempted on all priority levels by the new LSP and the unreserved bandwidth at a lowest priority level; and making a new LSP selection.

2. The method in claim 1, further comprising: determining a priority level associated with the new LSP.

3. The method in claim 2, further comprising:

determining a resource requirement associated with the new LSP.

4. The method in claim 2, further comprising:

analyzing priority level information associated with data network links.

5. The method in claim 4, further comprising:

using the priority level information, selecting as the new LSP a LSP that has a minimal impact on established LSPs having a priority level lower than the priority level associated with the new LSP.

6. The method in claim 5, further comprising:

taking into account which or how many priority levels of established LSPs would be preempted by different LSP candidates.

7. The method in claim 1, further comprising:

selecting as the new LSP a shortest LSP from different LSP candidates having a requisite bandwidth and requisite priority with a least preemptive effect on established LSPs.

8. The method in claim 1, further comprising:

selecting as the new LSP a LSP that reduces preemption of lower priority established LSPs.

9. The method in claim 1, further comprising:

selecting as the new LSP a LSP that preempts a lowest priority level established LSP.

10. The method in claim 1, further comprising:

selecting as the new LSP a LSP that preempts a least amount of reserved resources of an established LSP.

11. The method in claim 1, further comprising:

selecting as the new LSP a LSP that preserves a largest amount of unreserved resources of an established LSP at a lowest priority level.

12. A method for selecting a new path through a data network that accounts for preemption of an established path in the data network by the new path, wherein the paths are Label Switched Paths (LSPs) established using Multi-Protocol Label Switching (MPLS), comprising:

determining data network link attributes provided by various label switched routers in the data network;

storing the determined link attributes in a database;

determining a highest priority level on which preemption will occur to establish a new LSP;

determining a bandwidth that will be preempted by the new LSP; and determining a total bandwidth that will be preempted on all priority levels by the new LSP and the unreserved bandwidth at a lowest priority level; and selecting the new LSP.

13. The method in claim 12, further comprising:

using one or more parameters to estimate the preemption.

14. The method in claim 13, wherein the one or more parameters include a maximum bandwidth for each link in the data network.

15. The method in claim 13, wherein the one or more parameters include a maximum reservable bandwidth for each link in the data network.

16. The method in claim 13, wherein the one or more parameters include an available bandwidth at each of multiple priority levels for each link in the data network.

17. The method in claim 12, further comprising:
selecting a LSP with a minimal number of preempted priority levels.

18. The method in claim 12, further comprising:
selecting a LSP with a minimal preempted bandwidth.

19. The method in claim 12, further comprising:
at a priority level that will be affected by the new LSP, selecting a LSP with a minimal bandwidth of the affected priority level.

20. The method in claim 12, further comprising:
selecting a LSP that maximizes unreserved bandwidth at a lowest priority level.

21. The method in claim 12, further comprising employing one or more of the following to reduce preemption:
(1) selecting a LSP that minimizes a number of preempted priority levels,
(2) selecting a LSP that minimizes a the total amount of preempted bandwidth,
(3) at an affected priority level, selecting a LSP that minimizes a bandwidth of the affected priority level, and
(4) selecting a LSP that maximizes unreserved bandwidth at a lowest priority level.

22. The method in claim 21, further comprising:
selecting a shortest LSP from candidate paths that satisfy one or more of (1)–(3).

23. The method in claim 12, wherein the data network link attributes are provided by Interior Gateway Protocol (IGP) extensions.

24. The method in claim 12, further comprising minimizing preemption of established LSP by performing one or more of the following:
(1) minimizing affected priority levels;
(2) at the affected priority level, minimizing the bandwidth preempted;
(3) maximizing unreserved bandwidth at a lowest priority level along the LSP; and
(4) any combination of (1)–(3).

25. A method for selecting a new path through a data network that reduces or minimizes a preemptive effect on one or more established paths in the data network by the new path, wherein the paths are Label Switched Paths (LSPs) established using Multi-Protocol Label Switching (MPLS), comprising:
determining data network link attributes provided by various label switched routers in the data network;
storing the determined link attributes in a database;
determining a hiahest priority level on which preemption will occur to establish a new LSP;
determining a bandwidth that will be preempted by the new LSP;
determining a total bandwidth that will be preempted on all priority levels by the LSP and the unreserved bandwidth at a lowest priority level; and
making a new LSP selection.

26. The method in claim 25, further comprising:
determining a priority level and a bandwidth associated with the new LSP.

27. The method in claim 26, further comprising:
determining bandwidth reservations for each link in the data network including a maximum bandwidth and an available bandwidth at each priority level.

28. The method in claim 27, further comprising:
eliminating links with insufficient resources to support the new LSP.

29. The method in claim 28, further comprising:
restricting remaining links to least cost LSPs.

30. The method in claim 28, further comprising:
for remaining paths, determining one or more of the following: (1) which lower priority level or levels will be affected by set up of the new LSP, (2) how much reserved bandwidth will be preempted at each priority level by the new LSP, and (3) how much free bandwidth is available at a lowest priority level.

31. The method in claim 30, further comprising:
selecting from one or more of (1)–(3) a LSP that preempts the lowest priority level, the least amount of reserved bandwidth, or most amount of unreserved bandwidth at the lowest priority level.

32. The method in claim 25, wherein the path selection is made using a Constrained Shortest Path First (CSPF)-based algorithm.

33. Apparatus for determining a new path through a data network comprising:
a database for storing attributes for links in the data network including priority level information associated with the data network links, and
data processing circuitry coupled to the database and configured to determine the new path taking into account the priority level information associated with the data network links stored in the database;
wherein the paths are Label Switched Paths (LSPs) established using Multi-Protocol Label Switching (MPLS) and the database stores link attributes from various label switched routers in the data network, and wherein the data processing circuitry is configured to:
determine a highest priority level on which preemption will occur in establishing a new LSP;
determine a bandwidth that will be preempted by the new LSP;
determine a total bandwidth that will be preempted on all priority levels by the new LSP and the unreserved bandwidth at a lowest priority level; and
make a new LSP selection.

34. The apparatus in claim 33, wherein the data processing circuitry is configured to determine a priority level associated with the new LSP.

35. The apparatus in claim 34, wherein the data processing circuitry is configured to determine a resource requirement associated with the new LSP.

36. The apparatus in claim 34, wherein the data processing circuitry is configured to analyze priority level information associated with data network links.

37. The apparatus in claim 36, wherein the data processing circuitry is configured to use the priority level information in selecting as the new LSP a LSP that has a minimal impact on established LSPs having a priority level lower then the priority level associated with the new LSP.

38. The apparatus in claim 37, wherein the data processing circuitry is configured to take into account which or how many priority levels of established LSPs would be preempted by different LSP candidates.

39. The apparatus in claim 33, wherein the data processing circuitry is configured to select as the new LSP a shortest LSP from different LSP candidates having a requisite bandwidth and requisite priority with a least preemptive effect on established LSPs.

40. The apparatus in claim 33, wherein the data processing circuitry is configured to select as the new LSP a LSP that reduces preemption of lower established LSPs.

41. The apparatus in claim 33, wherein the data processing circuitry is configured to select as the new LSP a LSP that preempts lowest priority level established LSPs.

42. The apparatus in claim 33, wherein the data processing circuitry is configured to select as the new LSP a LSP that preempts a least amount of reserved resources of an established LSP.

43. The apparatus in claim 33, wherein the data processing circuitry is configured to select as the new LSP a LSP that preserves a largest amount of reserved resources of an established LSP at a lowest priority level.

44. A router for use in a data communications network, comprising:
  path selection circuitry configured to determine a new path through the data network taking into account preemption information associated with data network links stored in the database;
  data packet forwarding circuitry configured to forward data packets on established paths and
  a database coupled to the oath selection circuitry for storing attributes for data network links,
  wherein the paths are Label Switched Paths (LSPs) established using Multi-Protocol Label Switching (MPLS), wherein link attributes from various label switched routers in the data network are stored in the database, and wherein the path selection circuitry is configured to:
  determine a highest priority level on which preemption will occur in establishing a new LSP;
  determine a bandwidth that will be preempted by the new LSP;
  determine a total bandwidth that will be preempted on all priority levels by the new LSP and the unreserved bandwidth at a lowest priority level; and
  select a new LSP.

45. The router in claim 44, wherein the path selection circuitry is configured to use one or more attributes to estimate the preemption.

46. The router in claim 44, wherein the one or more attributes includes a maximum bandwidth for each data network link.

47. The router in claim 44, wherein the one or more attributes includes a maximum reservable bandwidth for each data network link.

48. The router in claim 44, wherein the one or more attributes includes an available bandwidth at each of multiple priority levels for each data network link.

49. The router in claim 44, wherein the path selection circuitry is configured to select a LSP that reduces a number of preempted priority levels.

50. The router in claim 44, wherein the path selection circuitry is configured to select a LSP that reduces a total amount of preempted bandwidth.

51. The router in claim 44, wherein at a priority level that will be affected by the new LSP, the path selection circuitry is configured to select a LSP that reduces a bandwidth of the affected priority level.

52. The router in claim 44, wherein the path selection circuitry is configured to select a LSP that reduces unreserved bandwidth at a lowest priority level.

53. The router in claim 44, wherein the path selection circuitry is configured to employ one or more of the following to reduce preemption by:
  (1) selecting a LSP that minimizes a number of preempted priority levels,
  (2) selecting a LSP that minimizes a total amount of preempted bandwidth,
  (3) at an affected priority level, selecting a LSP that minimizes a bandwidth of the affected priority level, and
  (4) selecting a LSP that maximizes unreserved bandwidth at a lowest priority level.

54. The router in claim 53, wherein the path selection circuitry is configured to select a shortest LSP from candidate paths that satisfy one or more of (1)–(3).

55. The router in claim 44, wherein the link attributes are provided by Internet Gateway Protocol (IGP) extensions.

56. The router in claim 44, wherein the path selection circuitry is configured to use link attributes in selecting the new LSP.

57. The router in claim 44, wherein the path selection circuitry is configured to employ a Constrained Shortest Path First (CSPF)-based algorithm to select the new LSP.

58. The router in claim 44, wherein the path selection circuitry is configured to minimize preemption of links by performing one or more of the following
  (1) minimizing a number of priority levels along the LSP that will be affected by the new LSP;
  (2) at an affected priority level, minimizing the bandwidth preempted;
  (3) maximizing unreserved bandwidth at a lowest priority level along the LSP;
  (4) any combination of (1)–(3).

59. A Label Switched Router (LSR), comprising:
  means for storing attributes of links in a data network;
  means for selecting a new path through a data network that minimizes a preemptive effect on one or more established paths in the data network by the new path; and
  means for forwarding data packets on established paths,
  wherein the oaths are Label Switched Paths (LSPs) established using Multi-Protocol Label Switching (MPLS), link attributes from various label switched routers in the data network are stored in the means for storing, and wherein means for selecting includes;
  means for determining a highest priority level on which preemption establishing a new LSP;
  means for determining a bandwidth that will be preempted by the new LSP;
  means for determining a total bandwidth that will be preempted on all priority levels by the new LSP and the unreserved bandwidth at a lowest priority level; and
  means for selecting the new LSP.

60. The LSR in claim 59, further comprising:
  means for determining a priority level and a bandwidth associated with the new LSP.

61. The LSR in claim 60, further comprising:
  means for determining bandwidth reservations for data network links including a maximum bandwidth and an available bandwidth at each priority level.

62. The LSR in claim 61, further comprising:
  means for eliminating links with insufficient resources to support the new LSP.

63. The LSR in claim 62, further comprising:
  means for restricting remaining links to least cost LSPs.

64. The LSR in claim 62, further comprising:
  means for remaining links, determining one or more of the following: (1) which lower priority level or levels will be affected by set up of the new LSP, (2) how much reserved bandwidth will be preempted at each priority level by the new LSP , and (3) how much free bandwidth is available at a lowest priority level.

65. The LSR in claim 64, further comprising:
  means for selecting a LSP that preempts the lowest priority level, the least amount of reserved bandwidth, or most amount of unreserved bandwidth at the lowest priority level.

* * * * *